United States Patent Office 2,907,135
Patented Oct. 6, 1959

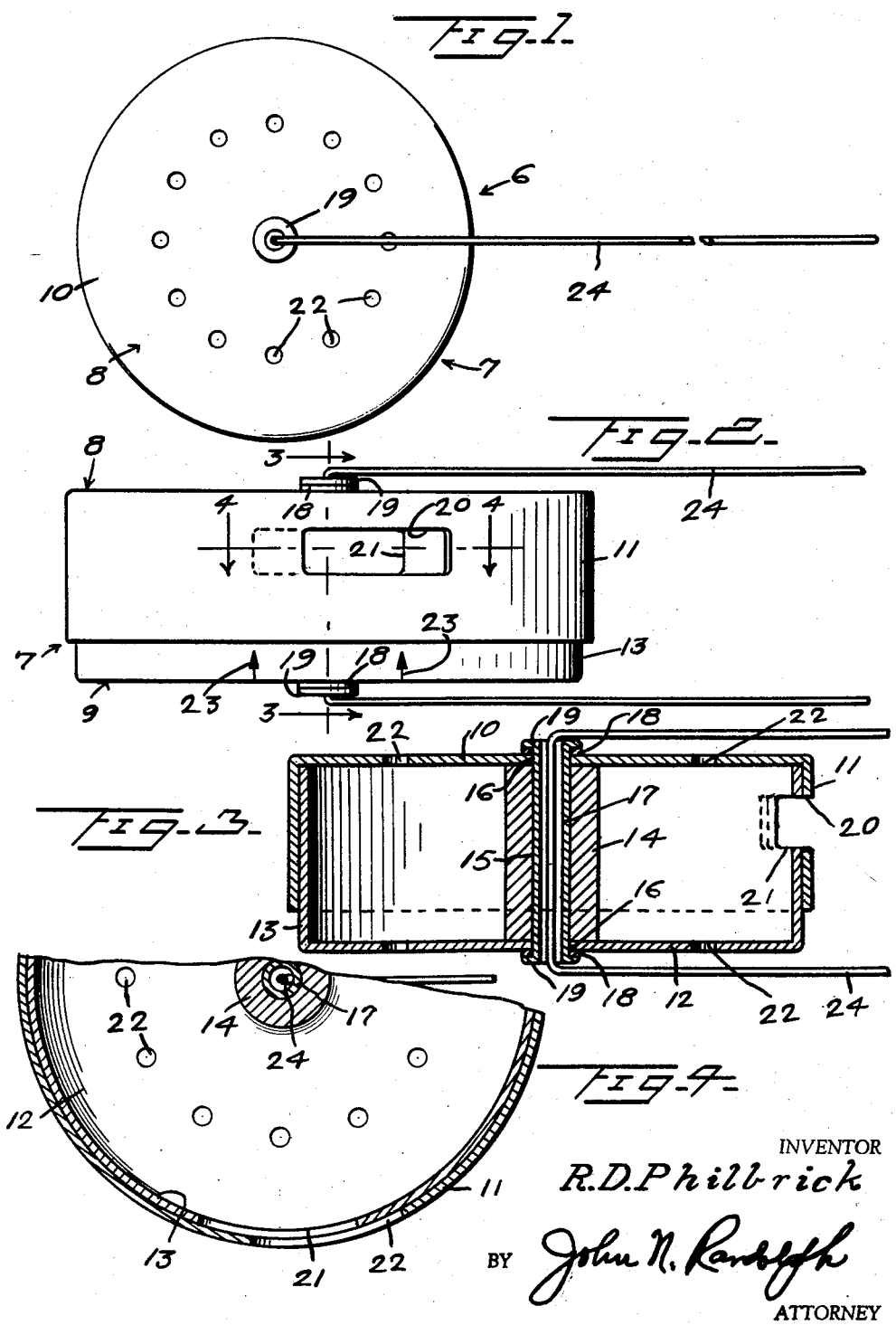

2,907,135

CONTAINER FOR LIVE INSECTS

Raymond D. Philbrick, Ericson, Nebr.

Application March 15, 1957, Serial No. 646,394

1 Claim. (Cl. 43—55)

This invention relates to a container of simple construction which may be conveniently employed by fishermen, entomologists, etc., for holding live insects such as grasshoppers, crickets and millers, and which is so constructed that there is no risk of the insects escaping from the container when the container is closed.

Another object of the invention is to provide a live insect container which may be readily opened to various extents for applying live insects thereto or for removing insects therefrom with substantially no risk of loss of the insects.

A further object of the invention is to provide a container for live insects which may be constructed in various sizes to be carried conveniently suspended from a part of the body, from wearing apparel, such as a belt, or which may be carried in a garment pocket.

Still a further object of the invention is to provide a container having no sharp edges which can damage wearing apparel or which could injure the user while being carried.

Various other objects and advantages of the invention will hereinafter become more fully apparent from the following description of the drawing, illustrating a presently preferred embodiment thereof, and wherein:

Figure 1 is a plan view of the live insect container;

Figure 2 is an enlarged elevational view thereof;

Figure 3 is a vertical sectional view, taken substantially along a plane as indicated by the line 3—3 of Figure 2, and Figure 4 is a fragmentary horizontal sectional view, taken substantially along a plane as indicated by the line 4—4 of Figure 2.

Referring more specifically to the drawing, the live insect container in its entirety is designated generally 6 and comprises a cylindrical walled container 7, composed of an outer section 8 and an inner section 9. The section 8 includes a substantially flat wall 10 and a cylindrical wall 11 which extends laterally from one side of the wall 10 at the periphery thereof. The inner or bottom section 9 likewise includes a substantially flat wall 12 and a cylindrical wall 13. The walls 12 and 13 are slightly smaller in diameter than the walls 10 and 11, respectively. However, the wall 13 is wider than the wall 11 and is sized to have a relatively snug fitting engagement therein, so that the container sections 8 and 9 may be turned relative to one another when the inner or lower section 9 is telescoped into the upper section 8.

The container 6 also includes a spacing sleeve 14 having a relatively thick wall which is of a length corresponding to the width of the cylindrical wall 13. The spacing member 14 is disposed centrally within the body portion 7 with the ends thereof abutting the inner sides of the central portions of the walls 10 and 12, when the inner section 9 is telescoped fully into the outer section 8, and so that the free edge of the cylindrical wall 13 abuts the inner side of the wall 10. The spacing member 14 has a relatively large bore 15 which aligns with central openings 16 of the walls 10 and 12. A tube 17 extends through and turnably fits the bore 15 and openings 16. Washers 18 are mounted on end portions of the tube 17 and are disposed against portions of the outer sides of the walls 10 and 12, which surround the openings 16. The ends of the tube 17 are flanged or flared outwardly as seen at 19 to retain the washers 18 on said tube and in sufficient frictional engagement with the container walls 10 and 12 to prevent casual turning of the sections 8 and 9 relative to one another.

The container sections 8 and 9 may be formed of sheet metal, aluminum or plastic and the spacing sleeve 14 may be formed of plastic, wood or other lightweight non-corrosive material.

The outer cylindrical wall 11 is provided with a circumferentially elongated opening 20 in a portion thereof, and the inner cylindrical wall 13 is provided with an opening 21 of the same size and shape as the opening 20. The openings 20 and 21 are disposed so that said openings are capable of being moved into full registration with one another by rotation of one of the sections 8 or 9 relative to the other. The walls 10 and 12, in the preferred form of the invention as disclosed in the drawing, are provided with small ventilating openings or apertures 22.

From the foregoing it will be readily apparent that one of the sections 8 or 9 can be rotated relative to the other to move the openings 20 and 21 into partial registration, as illustrated in Figures 2, 3 and 4, for applying live insects to the container 6 or for removing the insects therefrom, after which the opening thus formed can be closed by turning one of the sections 8 or 9 relative to the other to move the openings 20 and 21 out of registration with one another. The openings 20 and 21 may also be moved into partial registration for removing insects from the container 6 and which can be accomplished by shaking the live insects therefrom or by permitting an insect to crawl through the opening thus provided. An exposed part of the inner section 9, located beyond the cylindrical wall 11, is provided with spaced markings 23, indicating the location of the ends of the opening 21, to facilitate moving said opening 21 into registration with the opening 20, when said opening 21 is in a position completely out of registration with the opening 20.

The container 6 may be made in various sizes either to be carried conveniently in a garment pocket or to be suspended from a part of the body or from a belt or other harness. When the container 6 is to be carried suspended from the body or a belt, a flexible member is passed through the tube 17 and the ends thereof are connected to provide a loop 24 of a convenient length for carrying the suspended container.

The vent openings 22 in the walls 10 and 12 may be omitted, in which case the container 6 may be conveniently used for holding meal or bran in which corn borers, meal worms and other bait used for ice fishing may be contained, and which bait can be readily shakened from the container 6 when the openings 20 and 21 are in registration.

Various modifications and changes are contemplated and may be resorted to, without departing from the function or scope of the invention as hereinafter defined by the appended claim.

I claim as my invention:

A container for live insects formed of telescopically interfitting container sections having overlapping cylindrical walls provided with openings movable into and out of registration with one another by rotation of one section relative to the other, and spaced substantially parallel end walls; the improvement which comprises a tube extending centrally through the container and through said end walls, said tube being turnably disposed in the end walls and having flanged ends disposed on the outer sides of said end walls, a spacing sleeve disposed within said container and through which said tube extends, said spacing being of substantial radial thickness and having flat ends abutting the inner sides of said end walls, and washers carried by the tube and disposed between the flanged ends thereof and said end walls and combining with the sleeve for frictionally engaging the end walls to resist rotation of the container sections relative to one another and for maintaining the container sections assembled such that the openings of the cylindrical walls of said container sections are disposed in circumferential alignment with one another.

References Cited in the file of this patent

UNITED STATES PATENTS

| | | |
|---|---|---|
| 763,916 | Livingston | June 28, 1904 |
| 1,140,625 | Spitzler | May 25, 1915 |
| 1,775,959 | Himes | Sept. 16, 1930 |
| 2,408,150 | Moeller | Sept. 24, 1946 |
| 2,655,288 | Caretto | Oct. 13, 1953 |
| 2,767,680 | Lermer | Oct. 23, 1956 |

FOREIGN PATENTS

| | | |
|---|---|---|
| 879 | Great Britain | 1906 |
| 944,764 | France | Nov. 8, 1948 |
| 1,083,281 | France | June 23, 1954 |